(No Model.)
J. C. ROSS, Jr.
GRAIN CLEANER.
No. 514,498. Patented Feb. 13, 1894.
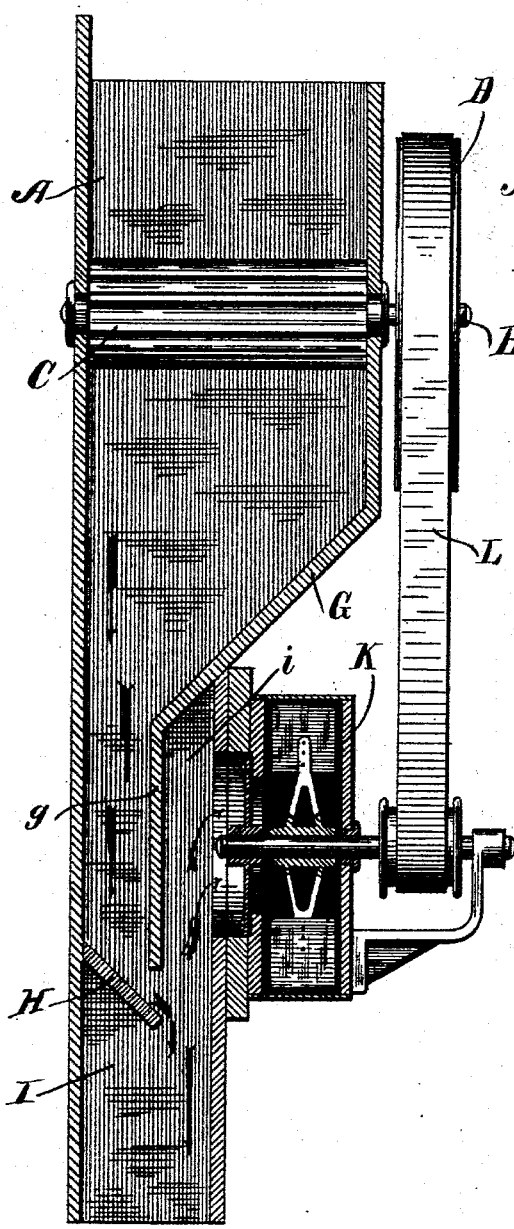
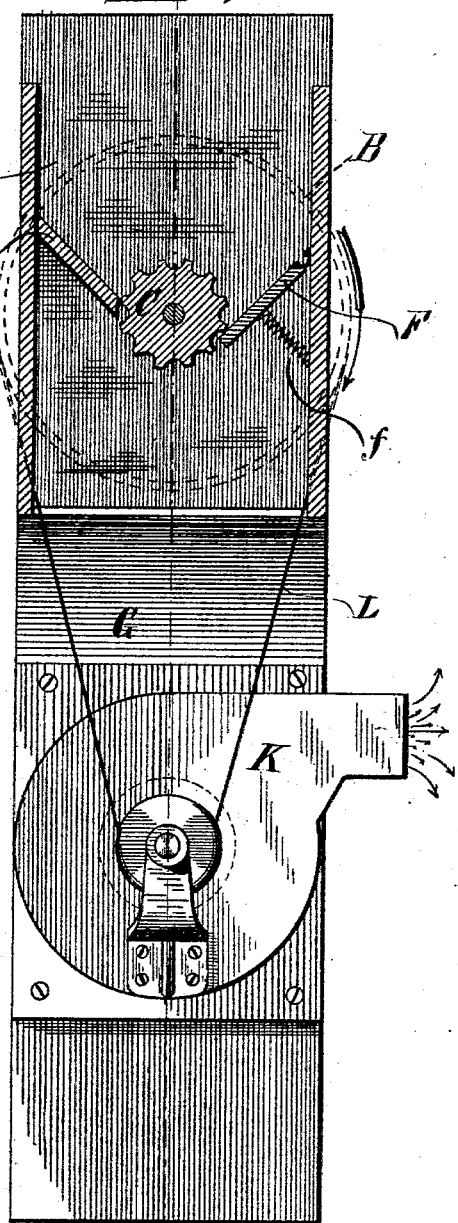
Witnesses.
Thos. F. Sheridan
Samuel E. Hibben
Inventor.
James C. Ross, Jr.
By Banning and Banning & Payson
Attorneys.
THE NATIONAL LITHOGRAPHING COMPANY,
WASHINGTON, D. C.

UNITED STATES PATENT OFFICE.

JAMES C. ROSS, JR., OF JOLIET, ILLINOIS.

GRAIN-CLEANER.

SPECIFICATION forming part of Letters Patent No. 514,498, dated February 13, 1894.

Application filed April 22, 1893. Serial No. 471,516. (No model.)

*To all whom it may concern:*

Be it known that I, JAMES C. ROSS, Jr., residing at Joliet, Illinois, have invented certain new and useful Improvements in Grain-Cleaners, of which the following is a specification.

The object of my invention is to provide a simple, efficient and economical grain cleaner; and the invention consists in the details and combinations hereinafter described and claimed.

In the drawings, Figure 1 is a vertical section taken on line 1 of Fig. 2; and Fig. 2 a front elevation, partly in section.

The object of my invention is to provide a grain cleaner of such construction that the grain stored in a barn or outhouse, and intended for immediate use—as food for cattle—may be easily and efficiently cleaned by placing the quantity which is required for immediate use within a receptacle and removing the chaff and lighter particles, allowing the clean grain to fall into a receptacle underneath the mechanism.

In constructing my improved grain cleaner, I use a hopper, A, of the desired form and size and adapted to hold a sufficient amount of grain to be cleaned for immediate use.

Mounted in suitable bearings, in the hopper A, is a shaft B, provided with a corrugated feed roll, C, between the inner sides of the hopper, and preferably as long as the hopper. On the outside I provide the shaft with a pulley, D, which may be provided with a handle to operate the shaft, or the shaft may have a crank at its extreme end for driving the same.

To deflect the grain toward the feed roll, I provide a hopper with a bottom board, E, preferably arranged at such an angle as to deflect the grain toward the feed roll, and extending in sufficiently to almost contact the feed roll. To prevent the grain from falling through the hopper, until it has been fed through by the corrugations of the feed roll, I provide a second inclined bottom board, F, which has its inner free end held yieldingly against the feed roll by means of the spiral spring $f$. This bottom board is preferably hinged at one side of the hopper, and has its inner end constructed so that it is vibrated by the revolutions of the roll, and thus serves to keep the grain agitated so that it will not become clogged in the corrugations of the feed roll; but it is evident that the board may be made long enough to contact the feed roll at a tangent, and not be vibrated by the rotations of the feed roll. The feed roll is rotated in the direction indicated by the arrow in Fig. 2, so that the grain to be cleaned will only pass out on that side of the roll which is contacted by the yielding bottom board.

Directly beneath the hopper, and in the path of the grain, is a primary deflector G, which serves to throw the grain to one side of the passage, and which is provided with a depending vertical portion, $g$, which forms one side of the channel for the grain to pass down. Directly below this channel is a second deflector H, which turns or deflects the grain toward the other side of the passage and into the passage I, through which the cleaned grain may pass out into any desired receptacle.

Arranged preferably between the deflectors, and to one side of the passage, $i$, which is formed by the vertically depending portion of the primary deflector and one side of the main channel, is an exhaust fan K, having its inner end open to the passage, so that during the rotation of the fan in its forward direction, it will serve to exhaust air from this passage, and feed the lighter particles of dust or chaff, that may be contained in the dirty grain, and expel the same outwardly, or through a system of piping to any desired point. I prefer to drive the fan by means of a pulley at the outer end of its shafting, which is connected to the main pulley on the feed roll by means of a belt L. In this manner I am enabled to make a simple and efficient grain separator and one which will occupy comparatively little space on account of the novel construction and arrangement of the parts. The flat side of the separator is adapted to lie close against the wall of the stable and the upper portion or hopper is enlarged and adapted to receive the unclean grain, and the lower portion narrowed down, making an offset between the hopper and providing a suitable location for the exhaust fan, which is arranged flatwise on the receptacle. Furthermore, the fan shaft and feed shaft are operated by gearing which is placed in the most convenient and accessible location, viz., at the front of the cleaner, and in a plane parallel to the wall. This arrangement and construction form a very simple and compact cleaner having a minimum projection from the wall and adapted to economize space.

What I regard as new, and desire to secure by Letters Patent, is—

1. In a grain cleaner, the combination of a receptacle having one flat side adapted to lie against the wall of the stable and provided with an upper enlarged portion to receive the uncleaned grain, means located in this enlarged portion for feeding forward the grain in small quantities, a deflector beneath the feeding mechanism formed by the bottom of the enlarged portion and adapted to deflect the grain toward one side of the passage, and an oppositely inclined deflector located in the narrow passage of the receptacle to deflect the grain in the other direction, and an exhaust fan arranged flatwise on the receptacle beneath the offset of the enlarged upper portion and above the lower opposite deflector, substantially as described.

2. In grain cleaners, the combination of a receptacle having an enlarged portion forming the hopper to receive the uncleaned grain, a corrugated cylinder mounted on a shaft within the enlarged portion, means for rotating the corrugated cylinder, bottom boards in the hopper adapted to deflect the grain toward the feeding mechanism and so arranged that during the rotation of the corrugated cylinder, the grain is fed forward in small quantities, a deflector beneath the feeding mechanism formed by the bottom board of the enlarged portion, a deflector arranged in the narrow passage of the receptacle for deflecting the grain in an opposite direction, and an exhaust fan arranged flatwise on the receptacle under the offset formed by the hopper and within the outline thereof, the whole so constructed and arranged that the pulleys of the feed and fan shafts may be operated by gearing in a plane parallel to the wall, substantially as described.

JAMES C. ROSS, JR.

Witnesses:
THOMAS A. BANNING,
EPHRAIM BANNING.